Oct. 27, 1931.  R. W. HACKETT ET AL  1,829,647
METHOD OF MAKING THE BORDER SEAL OF LAMINATED GLASS
Original Filed May 25, 1928
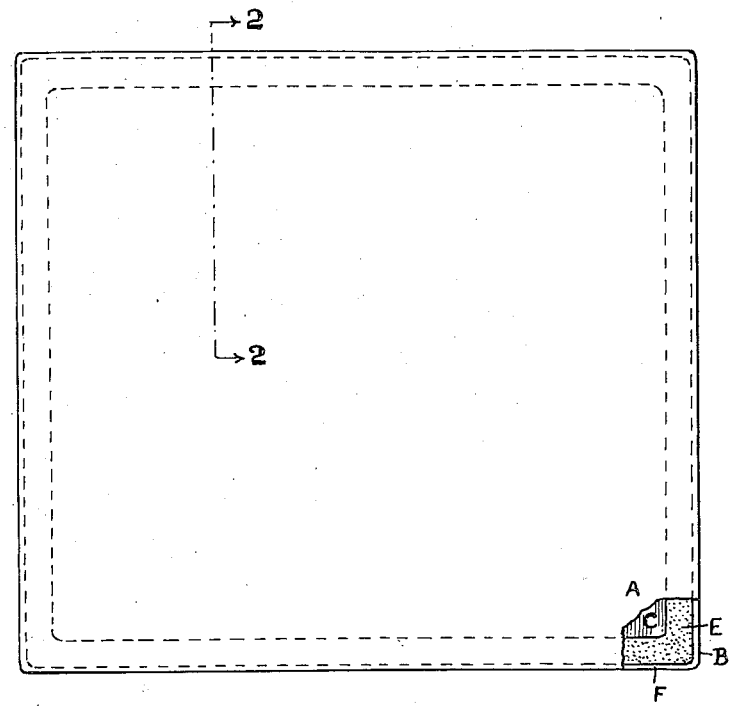
FIG.1
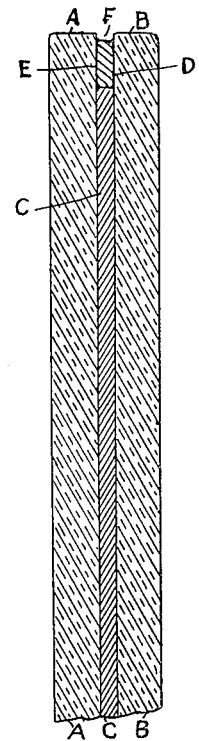
FIG.2
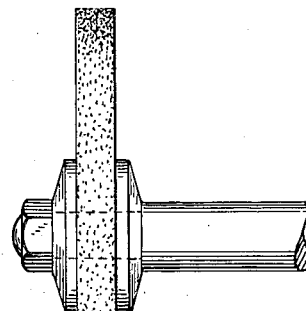
FIG.3
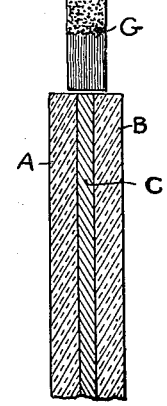
Inventors.
Robert W. Hackett & Arthur G. Worrall.
By 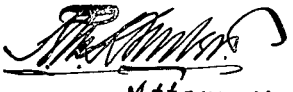
Attorney.

Patented Oct. 27, 1931

1,829,647

UNITED STATES PATENT OFFICE

ROBERT W. HACKETT, OF KIRKLYN, AND ARTHUR G. WORRALL, OF WYNCOTE, PENNSYLVANIA, ASSIGNORS TO LOUIS J. KOLB, OF PHILADELPHIA, PENNSYLVANIA, TRADING AS SAFETEE GLASS COMPANY

METHOD OF MAKING THE BORDER SEAL OF LAMINATED GLASS

Original application filed May 25, 1928, Serial No. 280,518. Divided and this application filed August 5, 1930. Serial No. 473,186.

Our invention has for its object the provision of a border seal for laminated glass which will prevent the entrance of air, gases and moisture to the celluloid or binding material between the glass sheets, the entrance of which has a tendency to cause a separation between the glass and the celluloid or binding material and thereby provide structural defects which impair the safety feature of the glass as well as causing discolorations which in time extend inward from the border to such an extent as to impair the clearness of the laminated glass structure.

This application is a division of our application, Serial No. 280,518, filed May 25, 1928.

In producing our improved laminated glass seal, and in practicing the method for producing the same, we proceed as follows: The border edges of the laminated glass are subjected to the action of a fine wire foundry brush rotating at a high speed, the result of which is to cut and remove the celluloid or pyroxylin binder between the edges of the glass sheets to form a groove or channel between said glass sheets and without injury to the glass. The depth of the groove is preferably three-thirty-seconds of an inch and its width is equal to the distance between the glass sheets. This channel or groove extends entirely around the border edge of the glass, and is then filled with a suitable sealing mixture preferably of a metallic nature and of a sufficient density that it will not flow or work out of the groove after once being deposited therein. We however, do not restrict ourselves to the character of composition of the sealing or luting material.

Referring to the drawings: Fig. 1 is a front view of a piece of laminated glass embodying our improved border seal; Fig. 2 is a cross-section of the same, on line 2—2, on a larger scale; and Fig. 3 is a similar cross-section of the laminated glass before the removal of the celluloid or binder to provide the grooved perimeter and showing the wire brush employed in forming the groove, the lower portion of the brush being broken away to show the wire bristles thereof.

A and B represent the two glass sheets which are united by the interposed sheet C of celluloid or pyroxylin compound, which may directly adhere to the glass or be insured connection therewith by first coating the facing glass surfaces with a thin layer of gelatin or other cementing material to form the laminated glass of commerce. For the purposes of our invention, it will suffice that the laminated glass may be composed of two glass sheets respectively united to and on opposite sides of a sheet of celluloid or other pyroxylin material.

A sheet of laminated glass of the foregoing character is then subjected to the abrading or cutting effect of a fine flexible wire foundry brush G revolving at a high speed when the edges of the laminated glass are presented to the perimeter of the brush, as shown in Fig. 3, and during which contact the ends of the brush wires (preferably about 0.006 inch diameter) cut into and remove the celluloid layer or sheet C to the desired extent to provide a groove D of suitable depth (three-thirty-seconds to one-eighth of an inch, for example), between the opposing faces of the glass sheets, as will be understood by reference to Figs. 1 and 2.

When the groove D is so provided and cleaned of all dust particles, it is then filled or substantially filled with a sealing compound E which is waterproof in character and effectually seals the groove and the entire bounding edges or perimeter of the laminated glass sheet against the entrance of gases including air, vapors or moisture; and it is desirable that the filling or sealing means for the groove shall be pliable or plastic, (in cold or warmed condition), so that it may be forced into the grooves by pressure applied mechanically or otherwise. The benefit of applying pressure to the pliable sealing material resides in the fact that it drives out the air or other gases and any vapors or moisture which may be present and, at the same time, be forced into retaining contact with the glass walls of the groove.

The sealing compound may be applied so as to wholly fill the groove, but preferably not quite filling the same, as indicated at F in Fig. 2. We have found it convenient to apply the sealing compound by use of a "gun" (not shown) having a nozzle end fitting the open part of the groove and provided with a piston for applying pressure to the compound within the gun, whereby it is slowly expelled, but no claim is made in this application to such appliance.

The sealing means may, in its simpler form, be a metallic paint of a viscous character, which will quickly set within the groove without objectionable tendency to "run". Such a paint may be composed of powdered aluminum or other metal mixed with a varnish-like carrier or vehicle containing dissolved gums.

We have described our improved method and the article of manufacture produced thereby in connection with apparatus which we deem to be best suited to the requirements of the invention, but we do not restrict or confine ourselves to the minor or secondary details either as to the method of procedure or the means employed in putting it into effect, as variations therein may be resorted to as matters for the skilled artisan and without a departure from the spirit of the invention.

What we claim is:

The herein described method of sealing the edges of laminated glass composed of two glass sheets with an interposed celluloid sheet, which consists in the removal of the perimeter edges of the celluloid sheet to a short distance by the employment of the cutting action of a rapidly rotating fine wire brush whereby the abrading action thoroughly cleans the binding material from the faces of the glass sheets forming the side walls of the groove, and thereafter introducing a sealing substance into the groove whereby it seals the same and attaches itself to the glass and celluloid surfaces therein.

In testimony of which invention, we hereunto set our hands.

ROBERT W. HACKETT.
ARTHUR G. WORRALL.